(12) United States Patent
Fujita et al.

(10) Patent No.: US 10,604,683 B2
(45) Date of Patent: Mar. 31, 2020

(54) ADHESIVE RESIN LAYER AND ADHESIVE RESIN FILM

(71) Applicant: FUJIMORI KOGYO CO., LTD., Tokyo (JP)

(72) Inventors: Shiro Fujita, Tokyo (JP); Atsushi Suzuki, Tokyo (JP); Hiroto Niimi, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/548,307

(22) PCT Filed: Feb. 29, 2016

(86) PCT No.: PCT/IB2016/000191
§ 371 (c)(1),
(2) Date: Aug. 2, 2017

(87) PCT Pub. No.: WO2016/185262
PCT Pub. Date: Nov. 24, 2016

(65) Prior Publication Data
US 2018/0022971 A1      Jan. 25, 2018

(30) Foreign Application Priority Data
May 18, 2015   (JP) ................................. 2015-100644

(51) Int. Cl.
*C09J 133/00*          (2006.01)
*B32B 27/30*           (2006.01)
(Continued)

(52) U.S. Cl.
CPC .......... *C09J 133/00* (2013.01); *B32B 27/308* (2013.01); *B32B 27/40* (2013.01); *C09J 7/00* (2013.01);
(Continued)

(58) Field of Classification Search
CPC . B32B 2307/412; B32B 27/308; B32B 27/40; C09J 133/00; C09J 175/14; C09J 7/00; C09J 7/10; C09J 7/30
(Continued)

(56) References Cited

U.S. PATENT DOCUMENTS 5,326,605 A * 7/1994 Ono .......................... C09J 4/06
428/41.2
2010/0148130 A1   6/2010 Namkung et al.
(Continued)

FOREIGN PATENT DOCUMENTS

EP   2226371 A2   9/2010
JP   3764133 B2   4/2006
(Continued)

OTHER PUBLICATIONS

Written Opinion for PCT/IB2016/000191, dated Jul. 19, 2016, 9 pages.
(Continued)

*Primary Examiner* — Thao T Tran
(74) *Attorney, Agent, or Firm* — Hauptman Ham, LLP (57) ABSTRACT

The present invention provides an adhesive resin layer and an adhesive resin film which can prevent generation of air bubbles even when adhered to a substrate having a high level difference, and in which even after thermal endurance and after wet thermal endurance, of a laminate obtained by laminating a substrate, an adhesive resin layer, and a substrate in an order, air bubbles are not generated, durability is good, and transparency can be maintained. More specifically, the present invention is a monolayered adhesive resin layer comprising an acrylic-based adhesive resin composition having transparency, wherein the adhesive resin composition contains an acrylic-based polymer, urethane acrylate, and a thermopolymerization initiator, and may
(Continued)

optionally contain an acrylic-based monomer, and an adhesive resin layer has pressure sensitive adhesiveness on both surfaces at an ambient temperature, and can be thermally cured by heating at a temperature of 100 to 250° C. and a time of 30 seconds to 10 minutes.

5 Claims, 2 Drawing Sheets

(51) Int. Cl.
  *B32B 27/40* (2006.01)
  *C09J 7/00* (2018.01)
  *C09J 7/30* (2018.01)
  *C09J 7/10* (2018.01)
  *C09J 175/14* (2006.01)

(52) U.S. Cl.
  CPC . *C09J 7/10* (2018.01); *C09J 7/30* (2018.01); *C09J 175/14* (2013.01); *B32B 2307/412* (2013.01)

(58) Field of Classification Search
  USPC ......... 428/355 EN, 355 AC, 355 N; 526/931
  See application file for complete search history.

(56) References Cited

U.S. PATENT DOCUMENTS

| | | | |
|---|---|---|---|
| 2011/0109848 A1* | 5/2011 | Yoon | C09J 133/066 349/96 |
| 2011/0205469 A1 | 8/2011 | Ha et al. | |
| 2013/0233485 A1 | 9/2013 | Herr et al. | |
| 2017/0368808 A1* | 12/2017 | Fujita | C09J 133/00 |

FOREIGN PATENT DOCUMENTS

| | | |
|---|---|---|
| JP | 3803200 B2 | 8/2006 |
| JP | 2008-63433 A | 3/2008 |
| JP | 2009191138 A | 8/2009 |
| JP | 2011509332 A | 3/2011 |
| JP | 4666715 B2 | 4/2011 |
| JP | 2012193321 A | 10/2012 |
| JP | 2014024899 A | 2/2014 |
| KR | 1020090077652 A | 7/2009 |
| TW | 200948916 A1 | 12/2009 |
| WO | 2007030584 A1 | 3/2007 |
| WO | 2012077809 A1 | 6/2012 |

OTHER PUBLICATIONS

International Search Report for PCT/IB2016/000191 dated Jul. 19, 2016, 4 pages.
Extended European Search Report for EP 16795956 dated May 25, 2018, 6 pp.
Office Action for Korean Patent Application No. 10-2017-7021575 dated Aug. 21, 2018, with English translation, 8 pages.
Office Action for Japanese Patent Application No. 2015-100644 dated Apr. 2, 2019 and English translation thereof; 4 pages.
Office Action for Japanese Patent Application No. 2015-100644 dated Jan. 8, 2019 and English translation thereof, 6 pages.
Notice of Allowance for Korean Patent Application No. 10-2017-7021575 dated Feb. 20, 2019 and English translation thereof, 2 pages.
Office Action for Taiwanese Patent Application No. 105105824 dated Jul. 2, 2019 and English translation thereof; 5 pgs.
Notice of Allowance for Japanese Patent Application No. 2015-100644 dated Aug. 6, 2019 and English translation thereof; 5 pgs.
Notice of Allowance for Taiwanese Patent Application No. 105105824 dated Nov. 27, 2019 and English translation thereof; 3pgs.
Office Action for European Patent Application No. 16795956.8 dated Jan. 7, 2020; 2 pgs.

* cited by examiner

ADHESIVE RESIN LAYER AND ADHESIVE RESIN FILM

CROSS REFERENCE TO RELATED APPLICATION

The present application is a 371 of International Application Number PCT/IB2016/000191, filed Feb. 29, 2016 which in turn, claimed the priority of Japanese Patent Application No. 2015-100644 filed on May 18, 2015.

TECHNICAL FIELD

The present invention relates to an adhesive resin layer and an adhesive resin film which can prevent generation of air bubbles even when adhered to a substrate having a level difference.

BACKGROUND TECHNOLOGY

As a pressure sensitive adhesive agent which can be easily released after use, a pressure sensitive adhesive agent, including an acrylic-based pressure sensitive adhesive agent, a photocurable acrylate compound such as urethane acrylate, an isocyanate-based curing agent (crosslinking agent), and a photopolymerization initiator, is used (for example, see Patent Documents 1 to 3). Since a pressure sensitive adhesive agent of this kind has pressure sensitive adhesiveness at an ambient temperature, and at the same time, can be re-released by reducing pressure sensitive adhesiveness by light irradiation, it is widely used in a pressure sensitive adhesive tape for semiconductor processing or for conveyance.

Meanwhile, an acrylic-based pressure sensitive adhesive agent is also widely used in order to laminate and adhere a substrate having transparency or translucency, such as a touch panel, a cellular phone, a display, and a laminated glass. There are cases where a surface of the substrate has a level difference due to a printing layer, a wiring, an electrode, a frame body or the like. When a pressure sensitive adhesive agent is laminated on a substrate having a level difference, a gap is generated between the level difference and the pressure sensitive adhesive agent, and when air bubbles remain, the adhesion strength between substrates and optical property through the substrate may be reduced.

DOCUMENTS OF RELATED ART

Patent Documents

Patent Document 1: Japanese Patent No. 3764133
Patent Document 2: Japanese Patent No. 3803200
Patent Document 3: Japanese Unexamined Patent Application, First Publication No. 2012-193321

SUMMARY OF THE INVENTION

Problem to be Solved by the Invention

The present invention was made in view of the above-mentioned circumstances, and an object thereof is to provide an adhesive resin layer and an adhesive resin film which can prevent generation of air bubbles even when adhered to a substrate having a high level difference, is good in durability without generating air bubbles even after thermal endurance and after wet thermal endurance, of a laminate obtained by laminating a substrate, an adhesive resin layer, and a substrate in an order, and can maintain transparency.

Means for Solving the Problem

In order to solve the above-mentioned problems, the present invention provides a monolayered adhesive resin layer comprising an acrylic-based adhesive resin composition having transparency, wherein the adhesive resin composition contains at least (A) an acrylic-based polymer, (B) urethane acrylate, and (C) a thermopolymerization initiator, and the adhesive resin layer has pressure sensitive adhesiveness on both surfaces at an ambient temperature, and can be thermally cured by heating at a temperature of 100 to 250° C. and a time of 30 seconds to 10 minutes.

It is preferable that an addition amount of the (B) urethane acrylate is 2 to 50 parts by weight based on 100 parts by weight of the (A) acrylic-based polymer.

It is preferable that the thermopolymerization initiator is a peroxide.

It is preferable that a temperature at which the peroxide has a half-life of 1 minute is 100° C. or higher.

It is preferable that the (A) acrylic-based polymer is an acrylic-based polymer which is crosslinked with a curing agent.

It is preferable that the curing agent includes at least one kind of an isocyanate-based compound or an epoxy-based compound.

The adhesive resin composition can contain (D) an acrylic-based monomer other than the (B) urethane acrylate.

Also, the present invention provides an adhesive resin film comprising the adhesive resin layer laminated between two separators.

Also, the present invention provides a laminate comprising two substrates laminated with the adhesive resin layer interposed between the two substrates.

Also, the present invention provides a method of producing a laminate comprising laminating two substrates with the adhesive resin layer interposed between the two substrates, and thermally curing the adhesive resin layer in a state where the resulting laminate is held between two dies.

When a boiling point of a solvent contained in a raw material composition of the adhesive resin layer is expressed as "Temperature A", a temperature at which the thermopolymerization initiator has a half-life of 1 minute is expressed as "Temperature B", a temperature at heating for removing the solvent in the step of producing the adhesive resin layer is expressed as "Temperature C", and a pressing temperature of a die in the step of thermally curing the adhesive resin layer is expressed as "Temperature D", it is preferable that each temperature is in an order of an equation (1) below:

$$\text{Temperature A} < \text{Temperature C} < \text{Temperature B} < \text{Temperature D}. \quad \text{Equation (1)}$$

At least one substrate of the two substrates can include one or more level differences of 5 μm to 1 mm in a surface on a side contacting with the adhesive resin layer.

It is preferable that the level difference is 50 μm to 1 mm.

It is preferable that a thickness of the adhesive resin layer of the present invention is larger than the level difference thereof. The thickness of the adhesive resin layer of the present invention is for example preferably 5.5 μm to 3 mm and more preferably 55 μm to 3 mm, which is 1.1 to 3 times of the level difference, and further preferably, for example, preferably 6 μm to 2 mm and more preferably 60 μm to 2 mm, which is 1.2 to 2 times of a thickness of the level difference.

It is preferable that a temperature of the die upon the thermal curing is a temperature of 150 to 300° C.

The present invention is characterized in that it comprises an acrylic-based polymer, a urethane acrylate, and a thermopolymerization initiator, and a transfer tape-like adhesive resin layer can be prepared from the above-mentioned components. The adhesive resin layer has substrate followability to a substrate having the level difference due to the urethane acrylate. The urethane acrylate is cured by the reaction initiation condition such as heat, and an adhesive resin layer in which air bubbles are not generated even when there is the level difference and a method of producing such adhesive resin layer can be provided. Particularly, by contrivance of an addition amount of the urethane acrylate, followability to a substrate and the strength of the transfer tape-like adhesive resin layer itself can be retained. According to the present invention, it has become possible that the adhesive resin layer is almost forced to follow a substrate forcibly, particularly by heat pressing. At producing of a laminate, not curing by electron beam irradiation or energy ray irradiation through the air, but thermal pressing in which both heat and pressure are applied to the laminate not through the air is preferable from the viewpoint of suppression of air bubble generation and durability.

Effects of Invention

According to the present invention, there can be provided an adhesive resin layer and an adhesive resin film which can prevent generation of air bubbles even when adhered to a substrate having a high level difference, and can maintain transparency.

BEST MODE FOR CARRYING OUT THE INVENTION

Referring to the drawings, the present invention will be illustrated below based on preferable embodiments.

Figure 1:
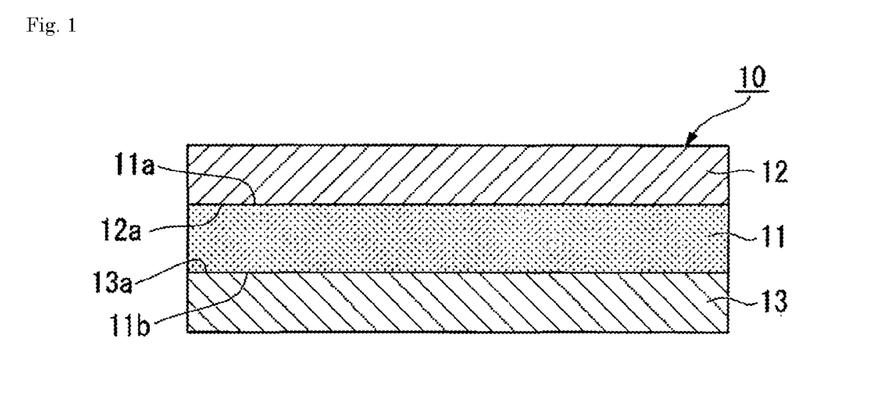
FIG. 1 is a cross-sectional view showing one example of the adhesive resin film of the present invention.

FIG. 1 shows a cross-sectional view of one example of an adhesive resin film 10. The adhesive resin film 10 has two separators 12, 13, and an adhesive resin layer 11 which is laminated between them. An adhesive resin composition constituting the adhesive resin layer 11 contains (A) an acrylic-based polymer, (B) urethane acrylate, and (C) a thermopolymerization initiator. Both surfaces 11a, 11b of the adhesive resin layer 11 have pressure sensitive adhesiveness at an ambient temperature (are pressure sensitive adhesive surfaces).

In addition, in the present specification, an "ambient temperature" is about 3° C. to about 40° C., preferably about 10° C. to about 30° C., more preferably about 15° C. to about 25° C., and most preferably about 23° C.

The adhesive resin layer 11 includes the adhesive resin composition over the entirety in a thickness direction. The adhesive resin layer 11 may be composed of two or more layers including the same kind or different kinds of adhesive resin compositions, as far as the layer includes the adhesive resin composition satisfying the requirement. When the adhesive resin layer 11 is composed of a monolayered adhesive resin layer, since a layer configuration can be simplified to reduce the cost, it is preferable. The adhesive resin composition includes an acrylic-based adhesive resin (polymer), and has transparency.

Separators 12, 13 have releasability on surfaces 12a, 13a on a side contacting with the adhesive resin layer 11 (are release surfaces). Examples of a configuration of separators 12, 13 include a configuration that a release layer is provided on one side or both sides of a resin film, and a configuration that a release agent is contained in a resin of a resin film. In place of the resin film, a paper, a synthetic paper, a metal foil, various sheets or the like may be used. When separators 12, 13 have transparency, since optical test of the adhesive resin layer 11 can be performed using the adhesive resin film 10 from which separators 12, 13 have not been released, as it is, this is preferable.

Figure 2:
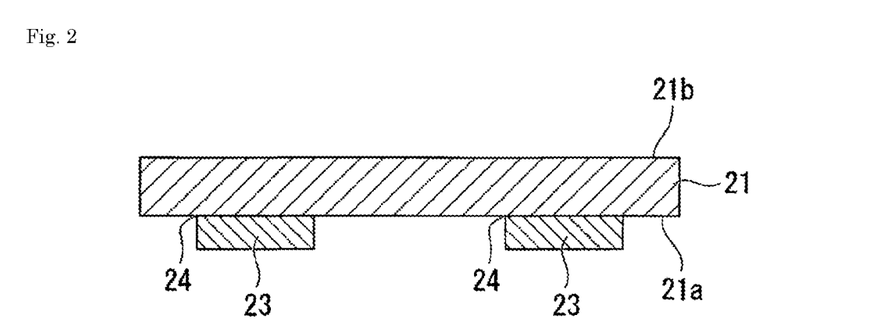
FIG. 2 is a cross-sectional view showing one example of a substrate having a level difference.
Figure 3:
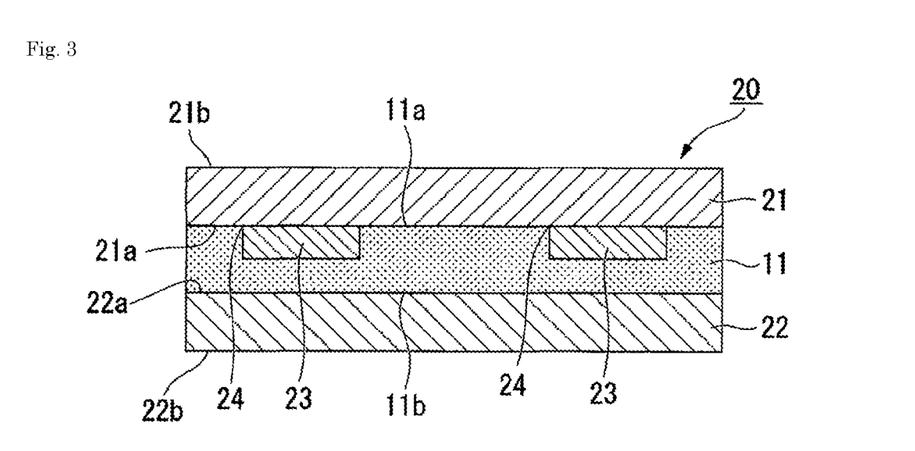
FIG. 3 is a cross-sectional view showing one example of a laminate in which an adhesive resin layer is laminated between two substrates.

Two substrates can be adhered to the adhesive resin film 10 shown in FIG. 1 with pressure sensitive adhesive surfaces 11a, 11b which are exposed by releasing separators 12, 13 from the adhesive resin layer 11. FIG. 3 shows one example of a laminate 20 in which the adhesive resin layer 11 is laminated between two substrates 21, 22. At least one of two substrates 21, 22 (herein, substrate 21) has a level difference due to a convex portion 23, as shown in FIG. 2. The level difference due to the convex portion 23 may exist on one of, or on both of surfaces 21a, 22a on a side where two substrates 21, 22 are contacted with the adhesive resin layer 11.

In FIG. 2, the convex portion 23 is shown separately from the substrate 21, but the convex portion 23 may be integrated with the substrate 21. For example, when irregularities are formed on a surface of a substrate, a portion from a bottom of a concave portion to a top of a convex portion (height difference) becomes a level difference. Level differences provided on surfaces 21a, 22a on a side contacting with the adhesive resin layer 11 may be small and large mixed ones, and may contain a level difference of 5 μm to 1 mm and preferably 50 μm to 1 mm.

Substrates 21, 22 are an adherend which is adhered with the adhesive resin layer 11. Respective substrates 21, 22 may be a rigid plate, or may have flexibility like a film. For example, the substrates may be a single plate of a glass, polycarbonate, an acryl, various resins, a ceramic, a metal or the like, or may be a composite composed of a plurality of materials, such as a liquid crystal panel, a touch panel, a cover glass, and a wiring substrate. Outer surfaces 21b, 22b of substrates 21, 22 may be flat, or may have irregularities.

When a laminate 20 as shown in FIG. 3 is formed, an order of releasing separators 12, 13 is not particularly limited. After one substrate is adhered to one pressure sensitive adhesive surface which is exposed by releasing one separator, the other substrate may be adhered to the other pressure sensitive adhesive surface which is exposed by releasing the other separator. After both separators are released to expose both pressure sensitive adhesive surfaces, substrates may be adhered, respectively.

Since the adhesive resin layer 11 contains the (B) urethane acrylate having flowability, it has high softness, and up to a corner portion 24 of a level difference of the convex portion 23 can be wetted with the adhesive resin composition. For this reason, even when the level difference is large, air bubbles can be suppressed. Since the adhesive resin layer 11 contains the (C) thermopolymerization initiator, connection can be made to be more firm, by thermally curing the layer after adhering. When compared with ultraviolet irradiation, there is an advantage that facilities for thermal curing are simple, and even when the substrate contains a portion having low translucency, the layer is securely cured.

Figure 4:
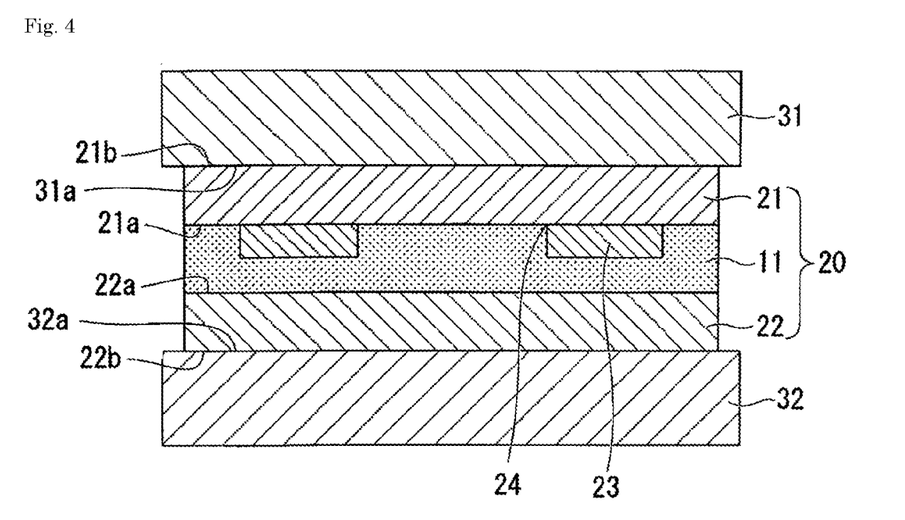
FIG. 4 is a cross-sectional view showing one example of the state where the laminate of FIG. 3 is held between dies.

By heating the laminate 20 obtained by laminating two substrates 21, 22 with the adhesive resin layer 11 interposed therebetween in the state where it is held between two dies 31, 32 as shown in FIG. 4, the adhesive resin layer 11 can be cured. Thereby, a reaction of the (A) acrylic-based polymer and the (B) urethane acrylate (polymerization, crosslinking or the like) progresses, and an adhering force between substrates 21, 22 is increased. Additionally, by performing pressurization together with heating, even when air bubbles remain around the level difference, gaps are filled, and air bubbles can be removed. Upon thermal curing, at least one of dies 31, 32 is heated.

When the laminate 20 is thermally pressed, a cushion (buffer sheet), a release sheet, a protective sheet or the like (inclusion) may intervene between dies 31, 32 and the laminate 20 (more particularly, between pressing surfaces 31a, 32a of dies 31, 32, and outer surfaces 21b, 22b of substrates 21, 22). When outer surfaces 21b, 22b of substrates 21, 22 have irregularities, since when a convex portion of outer surfaces is directly contacted with dies 31, 32, the pressure is easily concentrated on the convex portion, it is preferable that the above-mentioned inclusion is provided.

Dies 31, 32 do not cover a side surface of the laminate 20 in FIG. 4, but it may be configured that irregularities are provided on one or both of dies 31, 32, so that a side surface of the laminate 20 is covered with the die(s). For example, when one die is made to be a convex type, and the other die is made to be a concave type, after the laminate 20 is housed in a concave portion of the concave type, a convex portion of the convex type may approach toward the concave portion of the concave type.

Figure 5:
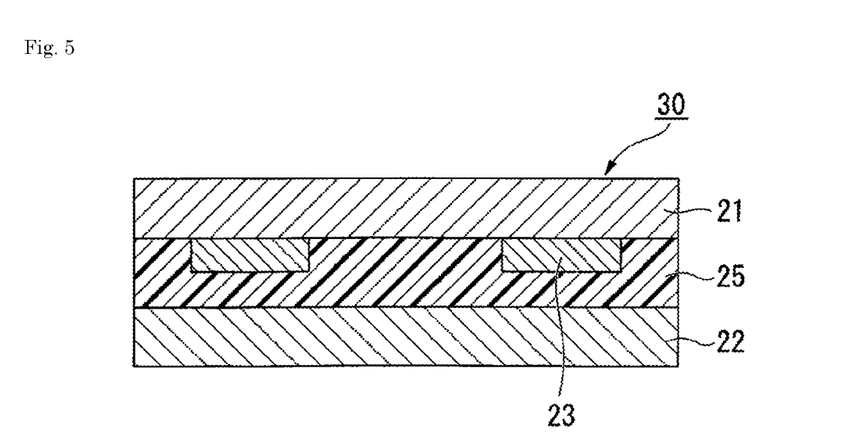
FIG. 5 is a cross-sectional view showing one example of a laminate in which an adhesive resin layer has been thermally cured.

FIG. 5 shows one example of a laminate 30 which is obtained by thermal curing. In this laminate 30, as a result of thermal curing of the adhesive resin layer 11, an adhesive layer 25 containing the thermally cured adhesive resin is laminated between two substrates 21, 22. Since hardness of the adhesive layer 25 after thermal curing has been increased, even when the adhesive resin layer 11 before heating is soft, re-release is difficult. Thereby, as the adhesive resin layer 11, a resin which is excellent in level difference followability despite of a low adhering force can be used.

Upon producing of the laminate 30, for example, when the substrate 21 has irregularities, and the substrate 22 is flat, several producing methods are contemplated. For producing the laminate 30, any methods can be adopted.

As a first laminating method, a method comprising laminating the adhesive resin layer 11 on the substrate 21 having irregularities, thereafter, performing autoclave treatment, laminating the flat substrate 22 on the adhesive resin layer 11, laminating the laminate 20, and thereafter, or while the substrate 22 being laminated, thermally curing the adhesive resin layer 11 using dies 31, 32 can be mentioned.

As a second laminating method, a method comprising laminating the adhesive resin layer 11 on the flat substrate 22, thereafter, performing autoclave treatment, laminating the substrate 21 having irregularities on the adhesive resin layer 11, and thereafter, or while the substrate 21 being laminated, thermally curing the adhesive resin layer 11 using dies 31, 32 can be mentioned.

As a third laminating method, a method comprising laminating the substrate 21 having irregularities, the adhesive resin layer 11, and the flat substrate 22 at the same time, and thereafter, or simultaneously with lamination, thermally curing the adhesive resin layer 11 using dies 31, 32 can be mentioned.

The first laminating method is a method in which since the adhesive resin layer has become easy to follow irregularities by adhering the substrate 21 having irregularities and the adhesive resin layer 11 previously, and performing autoclave treatment, air bubbles can be reduced even when the condition for thermal pressing is greatly fluctuated. Additionally, the third laminating method is a method having greatest merits in the cost, in a point that a producing process can be shortened.

In FIG. 2 to FIG. 5, the level difference of substrate 21, 22 has been provided in advance on the substrates before thermal pressing, but it is also possible to deform one or both of substrates 21, 22 to generate the level difference, when the adhesive resin layer 11 is laminated between substrate 21, 22 to perform thermal pressing. For example, when irregularities are provided on pressing surfaces 31a, 32a of dies 31, 32, substrates 21, 22 having flexibility such as a resin film can be deformed. By possession of flowability by the initial adhesive resin layer 11, it can follow the level difference of substrates 21, 22. Additionally, during thermal pressing, by progression of thermopolymerization, the adhesive resin layer 11 can be cured to suppress generation of gaps and air bubbles. Further, by connection of substrates 21, 22 with the adhesive layer 25, deformation of the substrates can be fixed to realize molding of irregularities. When a convex portion is formed on an internal surface of the substrate, a concave portion may be formed on an outer surface on a back side.

In order to improve handleability of the adhesive resin layer 11, it is preferable that the adhesive resin layer 11 is thermally cured by heating at a temperature of 100 to 250° C. and a time of 30 seconds to 10 minutes. It is preferable that the layer is thermally cured under the condition of at least a part of these temperature and time ranges, and it is more preferable that the layer is thermally curable in the whole ranges. The thermal curing condition at practical use may be outside the above-mentioned ranges. However, from the viewpoint of preservability, it is preferable that thermal curing does not substantially progress at an ambient temperature, and it is preferable that the layer has a nature that it is not thermally cured by heating, for example, within 10 minutes at a temperature of 100° C. or lower.

In the state where the adhesive resin layer 11 is uncured (before heating), it is preferable that a storage elastic modulus at a temperature of 23° C. is $1 \times 10^4$ to $1 \times 10^6$ Pa. Additionally, after the adhesive resin layer 11 has been thermally cured by heating, it is preferable that a storage elastic modulus at a temperature of 23° C. is $1 \times 10^4$ to $1 \times 10^9$ Pa. It is preferable that a storage elastic modulus at a temperature of 23° C. after thermal curing by heating is higher than a storage elastic modulus at a temperature of 23° C. before heating. These storage elastic moduli can be measured by making the adhesive resin layer in the uncured state (before heating), and the adhesive resin layer after thermal curing by heating (adhesive layer after thermal curing) have a temperature of 23° C., respectively. The vibration frequency when a storage elastic modulus is measured is, for example, 1 Hz. When a storage elastic modulus of the adhesive layer after thermal curing is measured, the adhesive layer after thermal curing can be obtained as a single body by heating and curing the adhesive resin layer between separator films without adhering the adhesive resin layer to the substrate, and thereafter, releasing the separator films.

Then, the adhesive resin layer which is also a transfer tape will be illustrated in further detail.

Since it becomes possible to coat an adhesive raw material composition used in producing the adhesive resin layer of the present invention at a better precision of a thickness when the composition is dissolved in an organic solvent, it is preferable that the composition contains an organic solvent. By drying a solvent from the adhesive raw material composition, an adhesive resin layer is obtained. That is, the constitution of the adhesive raw material composition may be such that the solvent is added to the constitution of the adhesive resin composition constituting the adhesive resin layer. The adhesive resin layer can function as a pressure sensitive adhesive layer at an ambient temperature (before thermal curing).

Examples of a monomer constituting the (A) acrylic-based polymer include an acrylic-based monomer having an ester group (—COO—), an acrylic-based monomer having a carboxyl group (—COOH), an acrylic-based monomer having an amido group (—CONR$_2$ wherein R is a substituent such as a hydrogen atom or an alkyl group), an acrylic-based monomer having a nitrile group (—CN), and a non-acrylic-based monomer such as olefins, styrene, vinyl esters, vinyl ethers, and vinylsilane. As the (A) acrylic-based polymer, a copolymer composed of two or more monomers is preferable. A number average molecular weight of the (A) acrylic-based polymer before photopolymerization is preferably, for example, about 50,000 to 1,000,000. Examples of the viscosity include about 1,000 to 10,000 mPa·s.

Examples of the acrylic-based monomer having an ester group (—COO—) include alkyl (meth)acrylate, (meth)acrylate having a hydroxyl group (hydroxy group), (meth)acrylate having an alkoxy group or a polyether group, (meth)acrylate having an amino group or a substituted amino group, and the like. In addition, in the present specification, (meth)acrylate is a generic name of acrylate and methacrylate.

Examples of the acrylic-based monomer having a carboxyl group (—COOH) include acrylic acid, methacrylic acid, (meth)acrylate having a carboxyl group (—COOH), and the like.

Examples of the acrylic-based monomer having an amido group (—CONR$_2$ wherein R is a substituent such as a hydrogen atom or an alkyl group) include acrylamide, methacrylamide, and the like.

Examples of the acrylic-based monomer having a nitrile group (—CN) include acrylonitrile, methacrylonitrile, and the like.

It is preferable that in the (A) acrylic-based polymer, 50% by weight or more of a constituent monomer is composed of an acryl-based monomer. Particularly, it is preferable that 50% by weight or more of the constituent monomer is composed of one or two or more of alkyl (meth)acrylates represented by the general formula CH$_2$=CR$^1$—COOR$^2$ (wherein R$^1$ represents hydrogen or a methyl group, and R$^2$ represents an alkyl group having 1 to 14 carbon atoms). Specific examples of the alkyl (meth)acrylate include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isopentyl (meth)acrylate, n-hexyl (meth) acrylate, 2-ethylhexyl (meth)acrylate, n-octyl (meth)acrylate, isooctyl (meth)acrylate, isononyl (meth)acrylate, decyl (meth)acrylate, and dodecyl (meth)acrylate. Particularly, it is preferable to essentially use alkyl (meth)acrylate in which the carbon number of an alkyl group R$^2$ is 4 to 12 (for example, 50 to 100 mole %).

Additionally, examples of the (meth)acrylate containing a hydroxyl group include one or two or more of 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctane (meth) acrylate, polyethylene glycol mono(meth)acrylate, polypropylene glycol mono(meth)acrylate, cyclohexanedimethanol mono(meth)acrylate, and the like.

The (B) urethane acrylate is a compound having a urethane bond (—NH—COO—) and a (meth)acryloyloxy group (CH$_2$=CX—COO— wherein X=H or CH$_3$) in the same molecule. The number of urethane bonds in one molecule may be one or two or more. Additionally, the number of (meth)acryloyloxy groups in one molecule may be one or two or more. Examples of urethane acrylate include a compound obtained by reacting a (meth)acrylate compound having a hydroxyl group and an isocyanate compound; a compound obtained by reacting a urethane prepolymer obtained by reacting a polyol compound and a polyisocyanate compound, with a (meth)acrylate compound having a hydroxyl group; and the like. Examples of the polyol compound include polyester polyol, polyether polyol, and the like.

It is preferable that an addition amount of the (B) urethane acrylate is 2 to 50 parts by weight, based on 100 parts by weight of the (A) acrylic-based polymer. The relevant addition amount can also be 40 parts by weight or less.

It is preferable that the (B) urethane acrylate becomes a part of a polymer by thermal curing with the (C) thermopolymerization initiator, and is the liquid (fluid) having the viscosity lower than that of the polymer. As the (B) urethane acrylate, acrylate oligomers such as urethane acrylate oligomer can also be used. The number of polymerizable functional groups possessed by the (B) urethane acrylate is, for example, 1 to 5.

In the adhesive raw material composition of the present invention, in addition to the (B) urethane acrylate, other (D) acrylic-based monomer can also be added. Examples of the (D) acrylic-based monomer include the same monomers as the monomers constituting the (A) acrylic-based polymer, such as alkyl (meth)acrylate, (meth)acrylate containing a hydroxyl group, and acrylamide. The number of polymerizable functional groups such as a (meth)acryloyl group in one molecule may be 1 or 2 or more. Particularly, when a monomer of (meth)acrylate having a hydroxyl group is contained, a hydroxyl group having polarity becomes easy to be dispersed in the whole adhesive resin layer. Thereby, since the moisture is hardly condensed, and cloudiness of the adhesive resin layer is suppressed even under the environment having high humidity (further, high temperature), the above is preferable.

It is preferable that an addition amount of the (D) acrylic-based monomer is 30 parts by weights or less, based on 100 parts by weight of the (A) acrylic-based polymer. When an addition amount of urethane acrylate (or total of urethane acrylate and an acrylic-based monomer) is too large, an adhering force of the adhesive resin layer may be reduced too much, when thermally polymerized. It is preferable that an addition amount of the total of the (B) urethane acrylate and the (D) acrylic-based monomer is 2 to 50 parts by weight. The relevant addition amount can also be 40 parts by weight or less.

Examples of the (C) thermopolymerization initiator include a radical initiator which is degraded by heat to initiate polymerization of a monomer (radical polymerization) and curing of a resin. As the radical initiator, a redox initiator, an organometallic compound, and the like, which act at a low temperature, are known, but from a point of handleability of the adhesive resin layer, an (organic) peroxide-based, an azo-based, and the like, which act at a higher temperature, are preferable. Since the thermopolymerization initiator is not reacted or halved during manufacturing of a transfer tape, particularly, in a step of drying a solvent, it is preferable that a temperature at which a half-life of the thermopolymerization initiator becomes 1 minute (hereinafter, this may be referred to as "1-minute half-life temperature") is higher than a boiling point of an organic solvent contained in the adhesive raw material composition. Additionally, it is preferable that the thermopolymerization initiator is a material having a 1-minute half-life temperature which is lower than a thermal pressing set temperature by 50° C. or more, to sufficiently react at a temperature at thermal pressing for a certain period of time.

Specific examples of the (organic) peroxide-based thermopolymerization initiator include diacyl peroxides such as benzoyl peroxide, acetyl peroxide, decanoyl peroxide, and lauroyl peroxide; dialkyl peroxides such as dicumyl peroxide and di-t-butyl peroxide; alkylperoxy esters such as t-butyl peroxybenzoate and t-butyl peroxy-2-ethylhexanoate; hydroperoxides such as cumene hydroperoxide and t-butyl hydroperoxide; and the like. Among them, an organic peroxide having the above-mentioned 1-minute half-life temperature of 100° C. or higher is preferable, and an organic peroxide having the 1-minute half-life temperature in the range of 100° C. to 200° C. is more preferable. Examples of such an organic peroxide include t-hexyl peroxyneodecanoate, t-butyl peroxyneodecanoate, t-butyl peroxyneoheptanoate, t-hexyl peroxypivalate, t-butyl peroxypivalate, dilauroyl peroxide, 1,1,3,3-tetramethylbutyl peroxy-2-ethylhexanoate, disuccinic acid peroxide, t-hexyl peroxy-2-ethylhexanoate, t-butyl peroxy-2-ethylhexanoate, 1,1-bis(t-hexylperoxy) cyclohexane, 1,1-bis(t-butylperoxy) cyclohexane, t-hexyl peroxyisopropyl monocarbonate, t-butylperoxymaleic acid, t-butyl peroxy-3,5,5-trimethylhexanoate, t-butyl peroxyisopropyl monocarbonate, t-butyl peroxy-2-ethylhexyl monocarbonate, t-butyl peroxylaurate, t-hexyl peroxybenzoate, t-butyl peroxyacetate, t-butyl peroxybenzoate, n-butyl 4,4-bis(t-butylperoxy)valerate, dicumyl peroxide, di-t-hexyl peroxide, di-t-butyl peroxide, p-menthane hydroperoxide, and the like.

Examples of the azo-based thermopolymerization initiator include 2,2'-azobis(isobutyronitrile), 2,2'-azobis(2-methylbutyronitrile), 2,2'-azobis(2,4-dimethylvaleronitrile), 2,2'-azobis(4-cyanovaleronitrile), 2,2'-azobis(4-methoxy-2,4-dimethylvaleronitrile), 2,2'-azobis(methylisobutyrate), 1,1'-azobis(1-cyclohexanecarbonitrile), and the like.

It is preferable that an addition amount of the (C) thermopolymerization initiator is 0.001 to 0.5 parts by weight, based on 100 parts by weight of the (A) acrylic-based polymer.

A polymerization retarder can be added to the adhesive resin layer in the present invention. By use of the polymerization retarder, it becomes easy to control a polymerization degree. Additionally, use of the polymerization retarder is preferable from the viewpoint that level difference followability is improved.

The adhesive resin composition can further contain arbitrary components other than (A) to (C). For example, (E) a crosslinking agent (curing agent) such as an isocyanate-based crosslinking agent, an epoxy-based crosslinking agent, and a metal chelate compound are suitably used to crosslink the (A) acrylic-based polymer, or a polymer which is produced by polymerization of the (B) urethane acrylate. In this case, as necessary, a polymer or a monomer having a functional group reacting with the (E) crosslinking agent is used, as at least a part of the (A) acrylic-based polymer or the (B) urethane acrylate. For example, in the case of the isocyanate-based crosslinking agent, the functional group reacting with the (E) crosslinking agent is a hydroxyl group, a carboxyl group or the like. An addition amount of the (E) crosslinking agent is preferably, for example, 1.5 equivalents or less relative to the functional group of the polymer.

Curing of the (A) acrylic-based polymer with the (E) crosslinking agent (curing agent) may progress by aging, at a stage at which the adhesive resin layer before adhering to an adherent is produced.

Examples of other arbitrary components include, for example, an antioxidant, a filler, a plasticizer, and the like. The adhesive raw material composition used in producing the adhesive resin layer may contain water or a solvent such as an organic solvent, or may be a solvent-free syrup-like composition. When a material which is potentially corroded, such as an oxide electrically conductive film such as ITO; a base metal; or the like, exists on a substrate, and the adhesive resin layer is contacted with this, it is preferable to reduce a corrosive component such as an acid, for example, by using a polymer having a low acid value, as a material of the adhesive resin composition.

It is preferable that a urethane acrylate oligomer component being a component which is cured at producing of the adhesive resin layer of the present invention is cured as much as possible. Additionally, the acrylic-based polymer and the urethane acrylate oligomer component have a great molecular weight, and compatibility as a paint frequently becomes bad. For this reason, it is desirable to add a compatibilizer. The compatibilizer having no reactivity may be used, but since there is a possibility that it is separated at a pressure sensitive adhesive layer, there is a possibility that a usable material is limited, and moreover, there is a high possibility that the problem of expansion at a durability test or the like arises depending on a kind or an addition amount, and versatility thereof is low. For this reason, since a compatibilizer which is cured together with the urethane acrylate oligomer component at a thermal reaction is polymerized, this also leads to suppression of expansion or the like, and accordingly, it is preferable to select a material carrying a reactive group. Furthermore, when an acrylic-based monomer which becomes hard after a thermal reaction is used as a compatibilizer, stability of the paint and, at the same time, the effect that a pressure sensitive adhesive layer becomes hard after curing can also be expected. Since the acrylic-based monomer is good in compatibility and, additionally, has the lower viscosity as compared with the acrylic-based polymer or the urethane acrylate oligomer, it becomes possible to adjust to the optimal viscosity at film formation by adding it when the viscosity of the paint is too high, and this also contributes to improvement in productivity. There can also be the case where the acrylic-based monomer is added more than the urethane acrylate oligomer.

(Method of Producing Adhesive Resin Layer)

The adhesive resin layer (transfer tape) in the present invention can be produced by applying the adhesive raw material composition on a separator film in the state where it contains a solvent, drying and, further, protecting this with a separator film. It is preferable that the adhesive raw material composition is applied using a die or a pipe doctor. In drying the solvent, drying with a drier or the like is preferable. Regarding a time for drying the solvent, in view of productivity, 10 minutes or shorter is preferable, and 2 to 5 minutes is further preferable. Additionally, since it is necessary to sufficiently dry the organic solvent, it is preferable to perform drying at a temperature not lower than a boiling point of the organic solvent, and it is preferable to perform drying at not higher than a 1-minute half-life temperature of the thermopolymerization initiator.

As described above, the present invention has been illustrated based on preferable embodiments, but the present invention is not limited to the above-mentioned embodiments, and can be variously modified in a range not departing from the gist of the present invention.

The laminate may have the adhesive resin layer between 3 or more substrates, respectively. It is preferable that one or more (preferably, all) of two or more adhesive resin layers contained in the laminate is (are) adhesive resin layer(s) of the present embodiment.

When the laminate is thermally pressed, two or more laminates may be arranged between a pair of dies. This arrangement is not particularly limited, but two or more laminates may be stacked in a direction of pressurization with the dies, or two or more laminates may be aligned in a plane vertical to a pressurization direction (for example, on a pressing surface of any die). The above-mentioned inclusion may intervene between two or more laminates.

In the present invention, after producing of the adhesive resin layer 11 as shown in FIG. 1, a laminate structure as shown in FIG. 3 is prepared, and the laminate 30 as shown in FIG. 5 is prepared via thermal treatment with a configuration as shown in FIG. 4, and it is preferable that a step of removing the solvent by heating from the adhesive raw material composition containing the solvent is provided, at the time of producing of the adhesive resin layer 11 of FIG. 1. Additionally, in the process condition after later adhering, it is necessary to heat the adhesive resin layer 11 to initiate polymerization.

(Pressing Condition)

In order to apply heat so that a temperature for heating the laminate becomes 100 to 250° C. at the time of pressing in the present invention, it is necessary to heat the die at a temperature higher than a desired heating temperature. A temperature of the die is preferably 100 to 300° C., and further preferably 150 to 300° C. In the case where the substrate or a part of the substrate contains polyethylene terephthalate, and when the polyethylene terephthalate is heated, for example, at 180° C. for about 10 minutes, ethylene terephthalate oligomer components are precipitated, and the precipitated components cause appearance defect, it is preferable that a heating temperature at thermal pressing is 180° C. or lower.

When the substrate does not contain polyethylene terephthalate, and a material which does not cause precipitation of ethylene terephthalate oligomer components is used, a heating temperature may be 100 to 300° C. Regarding a pressing time in the present invention, from the viewpoint of productivity, it is preferable that a reaction is completed within 2 minutes. Additionally, regarding a pressing temperature and time, they can be set so that the strength of the laminate becomes sufficient.

EXAMPLES

The present invention will be specifically illustrated below by way of examples.

(Example 1)

Using SK Dyne (registered trademark) 2094 (Soken Chemical & Engineering Co., Ltd., acid value: 33, number average molecular weight 70,000, solid content concentration 25%) as a polymer solution containing the (A) acrylic-based polymer, and E-AX (Soken Chemical & Engineering Co., Ltd.) as the crosslinking agent, the crosslinking agent was blended at the ratio of 0.56 parts by weight, based on 100 parts by weight of the acrylic-based polymer. To the resulting mixture were added 20 parts by weight of UV-3310B (The Nippon Synthetic Chemical Industry Co., Ltd., viscosity at 60° C.: 40,000 to 70,000 mPa·s, weight average molecular weight Mw: 5,000, number of oligomer functional groups: 2) as the (B) urethane acrylate, and 0.04 parts by weight of n-butyl 4,4-bis(t-butylperoxy)valerate (manufactured by NOF Corporation; product name: Perhexa (registered trademark) V) as the (C) thermopolymerization initiator, to prepare an adhesive raw material composition. The adhesive raw material composition contains ethyl acetate (boiling point 77° C.) as a solvent, and has an improved nature such as the viscosity as the paint for coating.

After the adhesive raw material composition was applied on an upper surface of a separator (manufactured by Fujimori Kogyo Co., Ltd.; product name: 125E-0010 DG2.5AS, thickness 125 μm) using an applicator so that a thickness of the adhesive resin layer (pressure sensitive adhesive layer) after drying became 50 μm, the solvent was dried in a drying step under the condition of 90° C. for 2 minutes, to prepare a laminate in which the adhesive resin layer is laminated.

Then, to an upper surface of the adhesive resin layer of the resulting laminate, a separator (manufactured by Fujimori Kogyo Co., Ltd.; product name: 38E-0010 BDAS, thickness 38 μm) was adhered to prepare an adhesive resin film of Example 1.

Thereafter, a reaction between the acrylic-based polymer and the crosslinking agent was completed by performing aging for one week, to form an adhesive resin layer in which three components of the crosslinked acrylic-based polymer, urethane acrylate, and the thermopolymerization initiator exist.

Regarding Examples 1 to 13 and Comparative Examples 1 to 3, a laminate containing the adhesive resin layer between separator films was produced, under the constitution of the adhesive raw material composition and the producing condition described in Table 1.

TABLE 1

| | Constitution of adhesive raw material composition | | | | |
|---|---|---|---|---|---|
| | Acrylic-based polymer/ part by weight | Crosslinking agent/ equivalent | Urethane acrylate/ part by weight | Reaction initiator/ part by weight | Thickness of adhesive resin layer/ μm |
| Example 1 | SK Dyne 2094/ 100 | E-AX/ 0.56 | UV-3310B/ 20 | Perhexa V/ 0.04 | 50 |
| Example 2 | Polymer of 2EHA and AA (90:10) Mn = 70,000, Mw = 1,260,000/ 100 | E-AX/ 0.14 | UV-3310B/ 2.5 | Perhexa V/ 0.01 | 50 |

TABLE 1-continued

| | Constitution of adhesive raw material composition | | | | |
|---|---|---|---|---|---|
| | Acrylic-based polymer/ part by weight | Crosslinking agent/ equivalent | Urethane acrylate/ part by weight | Reaction initiator/ part by weight | Thickness of adhesive resin layer/ μm |
| Example 3 | SK Dyne 2147/ 100 | TD-75/ 0.4 | UV-3310B/ 50 | Perhexa V/ 0.07 | 50 |
| Comparative Example 1 | SK Dyne 2094/ 100 | E-AX/ 0.56 | UV-3310B/ 40 | Irg651/ 0.4 | 50 |
| Comparative Example 2 | SK Dyne 2094/ 100 | E-AX/ 0.56 | UV-3310B/ 40 | — | 50 |
| Comparative Example 3 | SK Dyne 2094/ 100 | E-AX/ 0.56 | — | Perhexa V/ 0.04 | 50 |
| Example 4 | SK Dyne 2094/ 100 | E-AX/ 0.56 | UV-3310B/ 4.0 | Perhexa V/ 0.04 | 50 |
| Example 5 | SK Dyne 2094/ 100 | E-AX/ 0.56 | UV-3310B/ 60 | Perhexa V/ 0.04 | 50 |
| Example 6 | SK Dyne 2094/ 100 | E-AX/ 0.56 | UV-3310B/ 70 | Perhexa V/ 0.04 | 50 |
| Example 7 | SK Dyne 2094/ 100 | E-AX/ 0.56 | UV-3310B/20.0 UV-1700/20.0 | Perhexa V/ 0.04 | 50 |
| Example 8 | SK Dyne 2094/ 100 | E-AX/ 0.56 | UV-3310B/20.0 UV-1700/20.0 | Perocta O/ 0.04 | 50 |
| Example 9 | SK Dyne 2094/ 100 | E-AX/ 0.56 | UV-3310B/20.0 UV-1700/20.0 | Perbutyl O/ 0.04 | 50 |
| Example 10 | SK Dyne 2094/ 100 | E-AX/ 0.56 | UV-3310B/20.0 UV-1700/20.0 | Perhexa HC/ 0.04 | 50 |
| Example 11 | SK Dyne 2094/ 100 | E-AX/ 0.56 | UV-3310B/20.0 UV-1700/20.0 | Perhexyl Z/ 0.04 | 50 |
| Example 12 | N-7136/ 100 | Coronate HX/ 0.6 | UV-3310B/15.6 UV-1700/15.6 | Perocta O/ 0.03 | 50 |
| Example 13 | SK Dyne 2094/ 100 | E-AX/ 0.56 | UV-3310B/15.0 UV-1700/15.0 4HBA/15.0 | Perocta O/ 0.04 | 50 |
| Example 14 | SK Dyne 2094/ 100 | E-AX/ 0.56 | UV-3310B/20.0 4HBA/4.0 | Perhexa V/ 0.04 | 50 |

In addition, in Table 1, when a product is commercially available as a solution, a numerical value of part by weight indicates part by weight of each component constituting the adhesive resin layer among it. "SK Dyne 2094" and "SK Dyne 2147" represent SK Dyne (registered trademark) 2094 and SK Dyne (registered trademark) 2147, respectively. "N-7136" represents a product name of the acrylic-based polymer (The Nippon Synthetic Chemical Industry Co., Ltd.). "Coronate HX" represents Coronate (registered trademark) HX (Nippon Polyurethane Industry Co., Ltd.). "E-AX" indicates an epoxy-based curing agent (Soken Chemical & Engineering Co., Ltd.), and "TD-75" indicates an isocyanate-based curing agent (Soken Chemical & Engineering Co., Ltd.). "UV-3310B" and "UV-1700" represent a product name of urethane acrylate (The Nippon Synthetic Chemical Industry Co., Ltd.). "4HBA" represents 4-hydroxybutyl acrylate.

"Perhaxa (registered trademark) V" is a thermopolymerization initiator containing n-butyl 4,4-bis(t-butylperoxy) valerate as an active component. "Perocta (registered trademark) O" is a thermopolymerization initiator containing 1,1,3,3-tetramethylbutyl peroxy-2-ethylhexanoate as an active component. "Perbutyl (registered trademark) O" is a thermopolymerization initiator containing t-butyl peroxy-2-ethylhexanoate as an active component. "Perhexa (registered trademark) HC" is a thermopolymerization initiator containing 1,1-bis(t-hexylperoxy) cyclohexane as an active component. "Perhexyl (registered trademark) Z" is a thermopolymerization initiator containing t-hexyl peroxybenzoate as an active component. "Irg651" is a photopolymerization initiator containing 2,2-dimethoxy-2-phenylacetophenone (another name benzyl dimethyl ketal) as an active component.

(Test Results)

Then, evaluation methods and results thereof will be illustrated.

(Method of Evaluating Level Difference Followability by Appearance Confirmation after Thermal Pressing)

As substrates, a flat polyethylene terephthalate (PET) film was prepared as one substrate, and a polyethylene terephthalate (PET) film on which a printing level difference of 20 μm is formed on a surface was prepared as another substrate. As dies, dies each having a smooth surface so that an outer surface of a substrate after pressing (outer surfaces of a laminate) becomes smooth were used. A separator on one side was released from an adhesive resin film in advance, the film was adhered to a PET film on which a printing level difference had been formed, the adhered films and a smooth PET film on which a printing level difference had not been formed were held between dies with a thermal pressing machine, and thermal pressing was performed. Appearance of the laminate after adhering (adhered product) was visually confirmed immediately after thermal pressing, and evaluated as follows.

○: Air bubbles and defects were not visually observed on a laminate surface, and appearance was good.

Δ: Air bubbles or defects were visually observed on a laminate surface slightly, but appearance was at the level of no problem for practical use.

x: Air bubbles or defects were visually observed on a laminate surface, and appearance was outside the acceptable range.

Additionally, level difference followability was accessed as follows.

○: Air bubbles cannot be confirmed at a printing level difference portion.
Δ: Air bubbles can be confirmed extremely slightly at a printing level difference portion.
x: Air bubbles can be confirmed at a printing level difference portion.

(Method of Evaluating Adhesion Strength)

Evaluation of the adhesion strength was performed based on a measurement value of the adhesion strength of the laminate (adhered product) after thermal pressing, as follows. One separator of the adhesive resin film was released, one side of the adhesive resin layer was adhered to a polyethylene terephthalate (PET) film having a thickness of 100 μm, another separator was further released, a reverse side of a pressure sensitive adhesive layer was adhered to a soda lime glass having a thickness of 1 mm, which was an adhered, this was allowed to stand under the environment of 23° C. and 50% RH for 1 hour, the layer was released at a release rate of 300 mm/min, and its 180° release strength was measured.
○: The adhesion strength is 20 N/25 mm or more.
Δ: The adhesion strength is 5 N/25 mm or more and less than 20 N/25 mm.
x: The adhesion strength is less than 5 N/25 mm.

Results by the above-mentioned evaluation methods are shown in the following Table 2. Total evaluation was performed as follows.
⊙: Appearance, level difference followability, and the adhesion strength are all "○".
○: Appearance, level difference followability, and the adhesion strength are all "Δ" or "○", at least one is "Δ", and the number of "○" is larger than that of "Δ".
Δ: Appearance, level difference followability, and the adhesion strength are all "Δ" or "○", and the number of "Δ" is larger than that of "○".
x: At least one of appearance, level difference followability, and the adhesion strength is "x".

TABLE 2

| | Appearance | Level difference followability | Adhesion strength | Total evaluation |
|---|---|---|---|---|
| Example 1 | ○ | ○ | ○ | ⊙ |
| Example 2 | ○ | ○ | ○ | ⊙ |
| Example 3 | ○ | ○ | Δ | ○ |
| Comparative Example 1 | X | ○ | X | X |
| Comparative Example 2 | X | ○ | X | X |
| Comparative Example 3 | X | X | X | X |
| Example 4 | ○ | Δ | ○ | ○ |
| Example 5 | Δ | ○ | Δ | Δ |
| Example 6 | Δ | ○ | Δ | Δ |
| Example 7 | ○ | ○ | ○ | ⊙ |
| Example 8 | ○ | ○ | ○ | ⊙ |
| Example 9 | ○ | ○ | ○ | ⊙ |
| Example 10 | ○ | ○ | ○ | ⊙ |
| Example 11 | ○ | ○ | ○ | ⊙ |
| Example 12 | ○ | ○ | ○ | ⊙ |
| Example 13 | ○ | ○ | ○ | ⊙ |
| Example 14 | ○ | ○ | ○ | ⊙ |

(Results of Confirmation Evaluation of Appearance after Thermal Pressing)

It could be confirmed that, in the Examples, the adhesive resin layer follows a printing level difference. This may be because, in addition to the (A) acrylic-based polymer, the (B) urethane acrylate was added to the adhesive raw material composition as a component having high flowability.

In Comparative Example 3, air bubbles were confirmed at a printing level difference portion. In this example, it is considered that since the adhesive resin layer was formed from the adhesive raw material composition not containing (B) urethane acrylate, the adhesive resin layer cannot follow deformation of a substrate due to pressing of a die having a printing level difference.

In the case of Comparative Examples 1 to 3, when liberated from thermal pressing, expansion was confirmed on an entire surface. This may be because since, in Comparative Example 1, the adhesive raw material composition containing the photopolymerization initiator, but not containing the thermopolymerization initiator was heated by thermal pressing, and since in Comparative Example 2, the adhesive raw material composition containing urethane acrylate, but not containing the thermopolymerization initiator was heated by thermal pressing, polymerization of the acrylic-based monomer hardly progresses.

It is also possible to cure a formulation of the adhesive raw material composition of Comparative Example 1 by ultraviolet irradiation, but it is impossible to irradiate an ultraviolet ray at this time, in the state where pressed with an opaque die, and the composition is expanded at the time point at which the pressed state is liberated. For this reason, it is necessary to make a reaction progress during thermal pressing, any procedure may be used as far as it can realize this idea, and it is considered that a method of using a thermal reaction initiator which does not need new manufacturing facility investment and does not need to increase steps is most effective.

In the Examples, since the adhesive resin layer is adhered to a substrate which is adhered with PET or the like in the state where flowability is high, the layer can also be firmly attached to fine irregularities. Furthermore, it is considered that since a monomer having high flowability is flown by thermal pressing, the layer follows deformation, thereafter, a thermopolymerization reaction gradually progresses by heat, and a monomer component is polymerized, flowability of the adhesive resin layer is reduced, and the layer is cured in the deformed state, and accordingly, not only air bubbles were not generated at a deformed portion, but also expansion between substrates was not generated.

In the case of Examples 5 and 6, since when a blend of the adhesive raw material composition is allowed to stand for a long time, separation may be generated, immediate use is required. Furthermore, the blend has good appearance and level difference followability, but since it has the blending ratio near one of a pressure sensitive adhesive tape for semiconductor processing or for conveyance, it has a reduced pressure sensitive adhesive force, and becomes to have reworkability. However, since it passes a durability test, there is a possibility that it can be used depending on intended use. When only urethane acrylate used in Example 1 is reacted and cured by giving heat, since it becomes insoluble in an acrylic-based polymer solution, the paint for coating cannot be produced. Additionally, when the adhesive resin film produced in Example 1 is thermally treated before adhering, tackiness is reduced like the adhesive agent, adherability becomes extremely low, and a problem that the film is not firmly attached arises.

Addition of 4HBA having good compatibility as in Example 13 has the effect of securing stability of the paint. Since there is a tendency that as a molecular weight of the acrylic-based polymer is larger, heat resistance and durability become good, it is preferable to use a polymer, a molecular weight of which has been increased as much as possible.

In Example 14, by adding the acrylic-based monomer having flowability as compared with Example 1, a tendency that the leveling property at formation of a film of the adhesive resin layer is good, and uniformity of a film thickness is improved, was observed.

Without being limited to examples described in the above-mentioned examples, similar evaluation was performed by variously changing a peroxide, and as a result, it was seen that when the 1-minute half-life temperature of a peroxide is about 100 to 200° C., similar adhesion by thermal pressing is possible. When the 1-minute half-life temperature is lower than 100° C., there were cases where degradation of a peroxide progresses before thermal pressing, the sufficient adhesion strength is not obtained, and expansion occurs. When the 1-minute half-life temperature of a peroxide is too high, since shrinkage and deterioration of a film substrate to be used progress, thermal treatment must be performed in a short time, but since a reaction does not progress sufficiently, this is not preferable.

What is claimed is:

1. A monolayered adhesive resin layer comprising an acrylic-based adhesive resin composition having transparency, wherein
    said adhesive resin composition consisting essentially of (A) an acrylic-based polymer which is crosslinked with a curing agent, (B) urethane acrylate oligomer, (C) a thermopolymerization initiator, and (D) a monomer of (meth)acrylate having a hydroxyl group, wherein
    said adhesive resin composition contains 2 to 40 parts by weight of said (B) urethane acrylate oligomer, and 0.001 to 0.04 parts by weight of said (C) thermopolymerization initiator, based on 100 parts by weight of said (A) acrylic-based polymer, and
    said adhesive resin layer has pressure sensitive adhesiveness on both surfaces at an ambient temperature, and can be thermally cured by heating at a temperature of 100 to 250° C. and a time of 30 seconds to 10 minutes, wherein
    said adhesive resin layer is thermally cured after adhering the adhesive layer to a substrate having a level difference so that air bubbles are not generated between the adhesive resin layer and the level difference.

2. The adhesive resin layer according to claim 1, wherein said thermopolymerization initiator is a peroxide.

3. The adhesive resin layer according to claim 2, wherein a temperature at which said peroxide has a half-life of 1 minute is 100° C. or higher.

4. The adhesive resin layer according to claim 1, wherein said curing agent comprises at least one kind of an isocyanate-based compound or an epoxy-based compound.

5. An adhesive resin film comprising the adhesive resin layer according to claim 1 laminated between two separators.

* * * * *